April 18, 1950 H. M. WATSON ET AL 2,504,768
ELECTRONIC LOAD PROPORTIONING CIRCUIT
Filed May 19, 1948 4 Sheets-Sheet 3

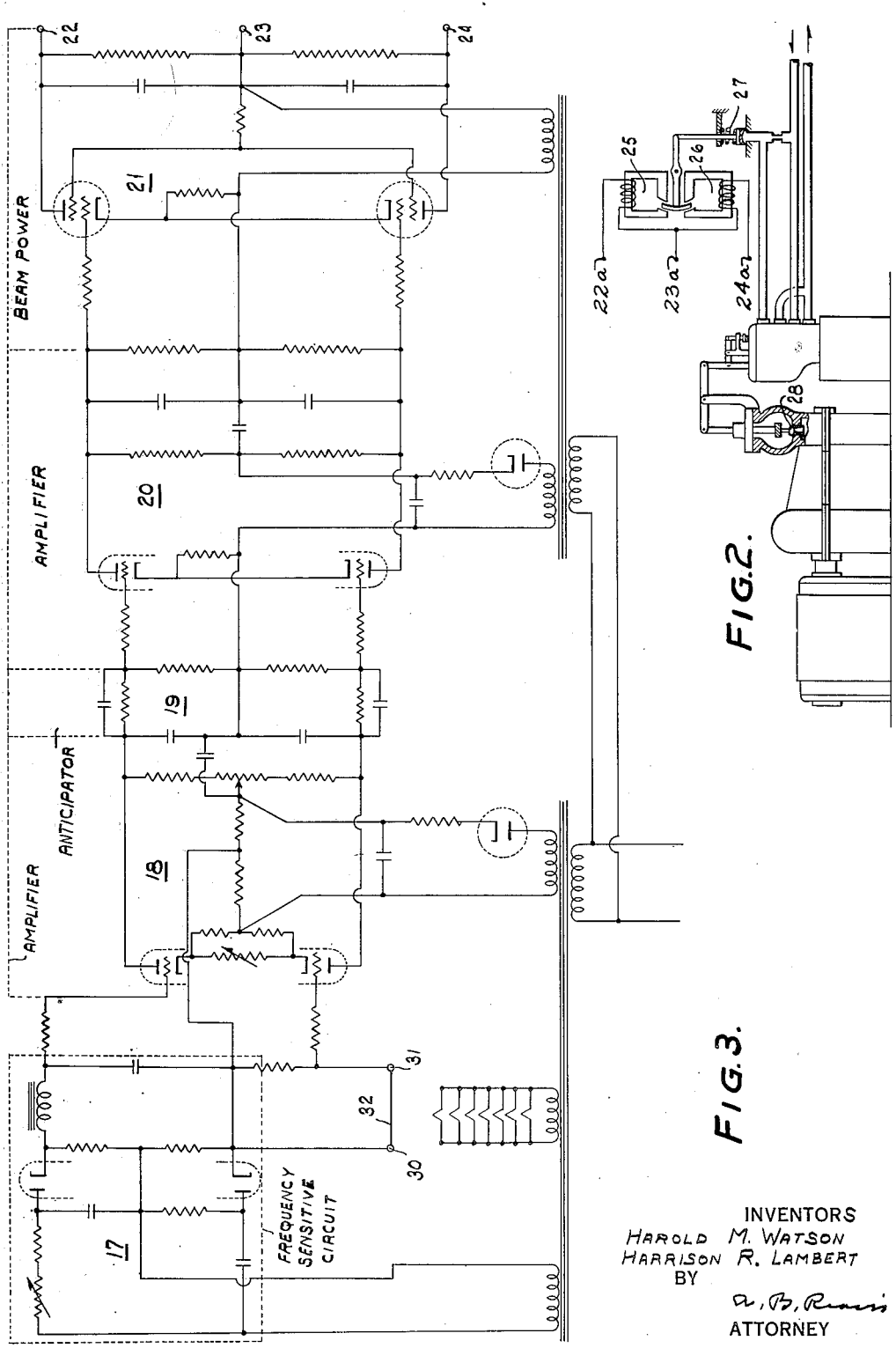

INVENTORS
HAROLD M. WATSON
HARRISON R. LAMBERT
BY
ATTORNEY

April 18, 1950     H. M. WATSON ET AL     2,504,768
ELECTRONIC LOAD PROPORTIONING CIRCUIT Filed May 19, 1948     4 Sheets-Sheet 4

INVENTORS
HAROLD M. WATSON
HARRISON R. LAMBERT
BY
ATTORNEY

Patented Apr. 18, 1950

2,504,768

UNITED STATES PATENT OFFICE 2,504,768

ELECTRONIC LOAD PROPORTIONING CIRCUIT

Harold M. Watson, Pittsburgh, and Harrison R. Lambert, McKeesport, Pa., assignors to Westinghouse Electric Corporation, East Pittsburgh, Pa., a corporation of Pennsylvania Application May 19, 1948, Serial No. 27,988

5 Claims. (Cl. 290—4)

The invention relates to a pair of generators supplying a common load and driven by a pair of prime movers or motors, and it has for an object to provide a system for controlling the input of energy to the motors so that the latter have very small speed droop or regulation from no load to full load, and so that the load is divided between the generators in predetermined relation.

In the application of Schwendner, Serial No. 27,997, filed May 19, 1948, there is disclosed and claimed an electro-hydraulic governor; and, in the application of Herwald et al., Serial No. 28,004, filed May 19, 1948, there is disclosed and claimed more particular frequency-responsive and magnetic aspects of a governor of this type. Such a governor makes it possible to operate with very small regulation or speed droop from no load to full load, for example, the regulation may be of the order of ½%. Ordinarily, where turbo-generators are connected in parallel, a speed droop of the order of 4% is provided so that the machines may properly share the load. If a better regulation, for example, ½%, is required, a very slight difference in the turbo-generator regulators will cause a large unbalance in load distribution. Accordingly, a more particular object of the present invention is to obtain a voltage quantity proportional to load unbalance and which quantity is used to secure better load distribution where parallel-operated machines are each regulated for small speed droop.

A further object of the invention is to provide a pair of parallel-connected turbo-generators, each provided with a regulator controlling the flow of steam thereto in response to generator frequency, and wherein the steam flow to one of the turbo-generators is also controlled in response to generator load difference.

The foregoing and other objects are effected by the invention as will be apparent from the following description and claims taken in connection with the accompanying drawings, forming a part of this application, in which:

Fig. 2 is a detail view showing a turbine admission valve and its operating means;

Figs. 3 and 4 are diagrams showing the frequency-responsive master and slave regulators;

Figure 1:
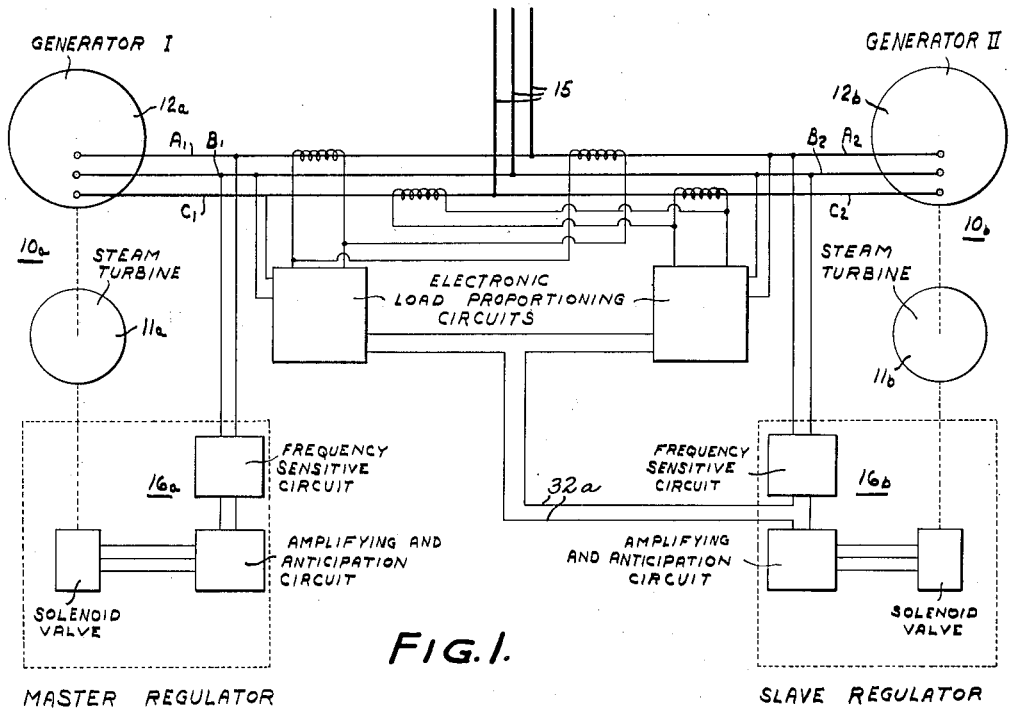
Fig. 1 is a block diagram of a power system having the improved regulating and load distributing apparatus.

In Fig. 1, there are shown turbo-generators, at $10a$, and, at $10b$, the turbo-generator at $10a$ including a turbine $11a$ driving an alternator $12a$ and that at $10b$ including a turbine $11b$ driving an alternator $12b$. The alternators $12a$ and $12b$ have leads or buses $A_1$, $B_1$ and $C_1$ and $A_2$, $B_2$ and $C_2$ for delivering power to the three-phase load circuit $15$.

The flow of steam to the turbines $11a$ and $11b$ is controlled by regulators, at $16a$ and at $16b$, which are similar except that the regulator $16b$ also uses the error voltage supplied from the load proportioning circuit hereinafter described.

As shown in Fig. 2, the flow of steam to each turbine $11a$ or $11b$ is controlled by means of an admission valve moved by a servo-motor operated in response to generator frequency, this arrangement being more particularly disclosed and claimed in the aforesaid application of Herwald et al.

Referring to Fig. 3, showing one of the frequency-responsive regulators, such regulator includes a frequency-responsive network, at $17$, whose electrical output is supplied to the amplifier, at $18$. Output from the amplifier is modified by the anticipation network, at $19$, in accordance with the rate of change thereof and the modified output is then amplified in the voltage and power stages $20$ and $21$ and furnished from the output terminals $22$, $23$ and $24$ to input terminals $22a$, $23a$ and $24a$ of the magnetic devices $25$ and $26$ (Fig. 2) operating, in conjunction with the spring $27$ to control pressure of a liquid used to position the admission valve $28$ to control the flow of steam to the turbine. In other words, change in modified electrical output is transformed into proportional change of liquid pressure used to position the admission valve.

The master and slave regulators, at $16a$, and at $16b$, respectively (Fig. 1), having input terminals $30$ and $31$ (Figs. 3 and 4) connected to the regulator circuit between the frequency-responsive network, at $17$ and the first amplifier stage, at $18$, such terminals of the master regulator being connected by a jumper $32$ (Fig. 3) whereas the slave regulator omits the jumper and has the terminals $30$ and $31$ supplied by leads $32a$ (Fig. 4), from the load proportioning circuit supplying error voltage input dependent on the difference in power supplied by the alternators to the load.

Figure 5:
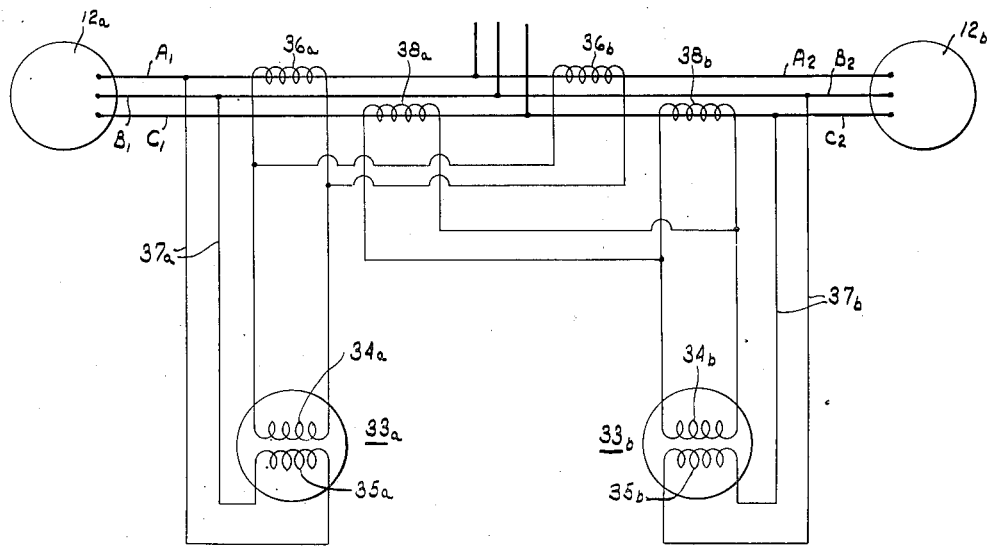
Fig. 5 is a diagram showing the connection of two wattmeters for measuring power differences.
Figure 6:
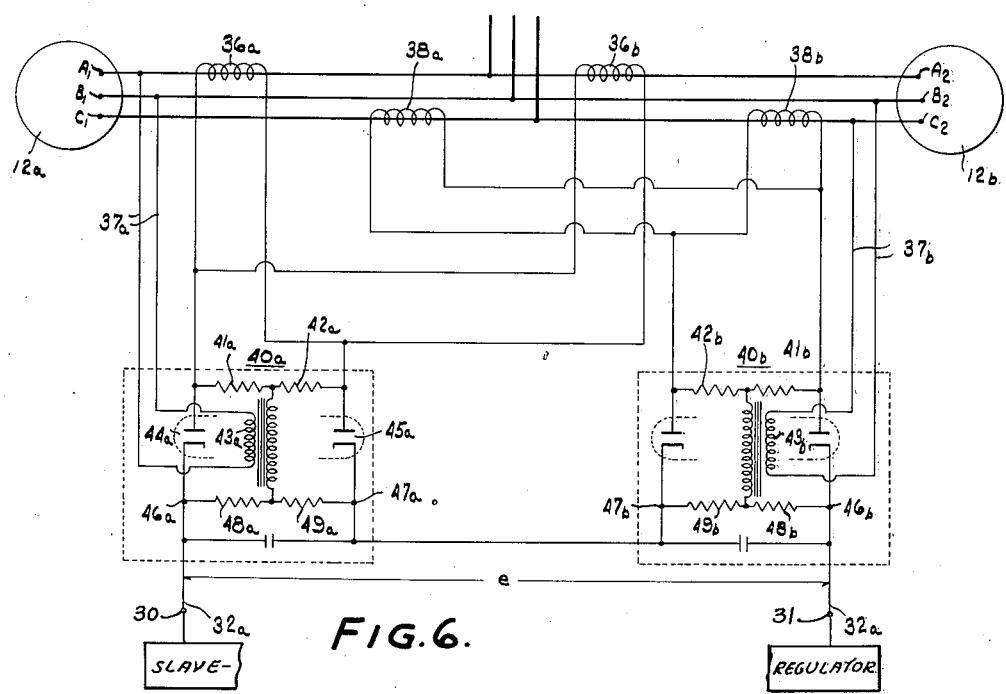
Figs. 6 and 7 are diagrams of electronic watt- meters operative to provide an error voltage quantity supplied to the slave regulator.
Figure 7:
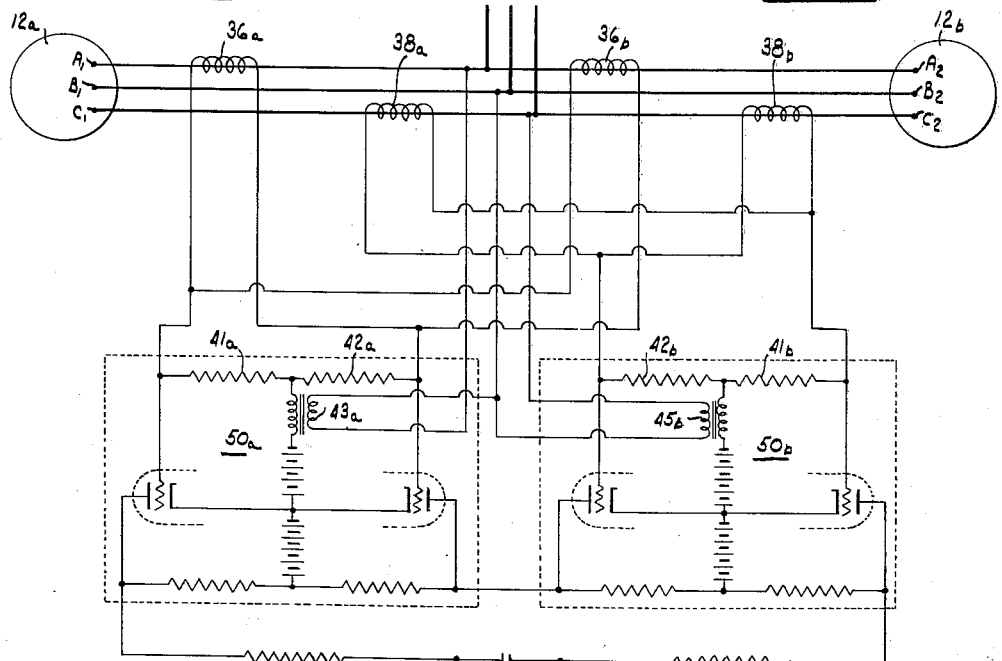

To aid in an understanding of the underlying principles of the load proportioning circuit and including electronic wattmeters, Figs. 6 and 7, reference is first made to Fig. 5 which shows a two-wattmeter method of measuring power, the wattmeter 33a having current and potential elements 34a and 35a supplied, respectively, by the secondary transformer windings 36a and 36b associated with the busses $A_1$ and $A_2$ and by the potential circuit 37a connected to the busses $A_1$ and $B_1$. In like manner, the wattmeter at 33b has similar current and potential elements 34b and 35b, the current element 34b being supplied from the current transformer secondary 38a and 38b associated with the busses $C_1$ and $C_2$ while the potential element 35b is supplied by a potential circuit 37b connected to busses $B_2$ and $C_2$. If the current transformers 36b and 38b were omitted, then the two wattmeters 33a and 33b taken together would indicate the total power delivered by generator 12a in the normal manner of the two-wattmeter method. However, the secondaries of transformers 36a and 36b are connected in such a way that their current difference will flow through the current element 34a of the wattmeter, at 33a. Current transformers 38a and 38b are connected in like manner. Therefore, the summation of readings of the wattmeter, at 33a and, at 33b, will be a function of the difference in power between the two alternators.

Fig. 6 shows the complete load proportioning network embodying the same current transformer connections just described; however, instead of supplying wattmeters, as in Fig. 5, the connections supply circuits at 40a and 40b enclosed by the dash lines. The current differences of transformers 36a and 36b and of transformers 38a and 38b flow through resistors 41a, 42a and 41b, 42b of the respective circuits. These circuits act much the same as the wattmeters in recognizing only current which is in phase with the voltages introduced by the transformers at 43a and 43b.

The voltage introduced by transformer 43a causes current to flow on alternate half cycles through the resistors 41a, 42a, the diode tube rectifiers 44a, 45a, and the resistors 48a, 49a of the circuit at 40a, the differences taken and the rectified and filtered output appears at terminals 46a and 47a.

If there is no voltage drop introduced across the resistors 41a and 42a by the current flow from the transformers 36a and 36b, then the net output at terminals 46a and 47a is zero. If the voltage drops across resistors 41a and 42a is 90 degrees out of phase with the voltage of the transformer, at 43a, these drops cancel out when the voltage difference is taken across the resistances 48a and 49a and again the net result is zero at terminals 46a and 47a.

Only those voltage components across resistances 41a and 42a which are in phase with the voltage of the transformer at 43a, will result in an error signal at the terminals 46a and 47a. The circuit, at 40b, operates in a similar manner, the voltage components across the resistances 41b and 42b which are in phase with the voltage of the transformer at 43b resulting in error signal at the terminals 46b and 47b.

Figure 4:
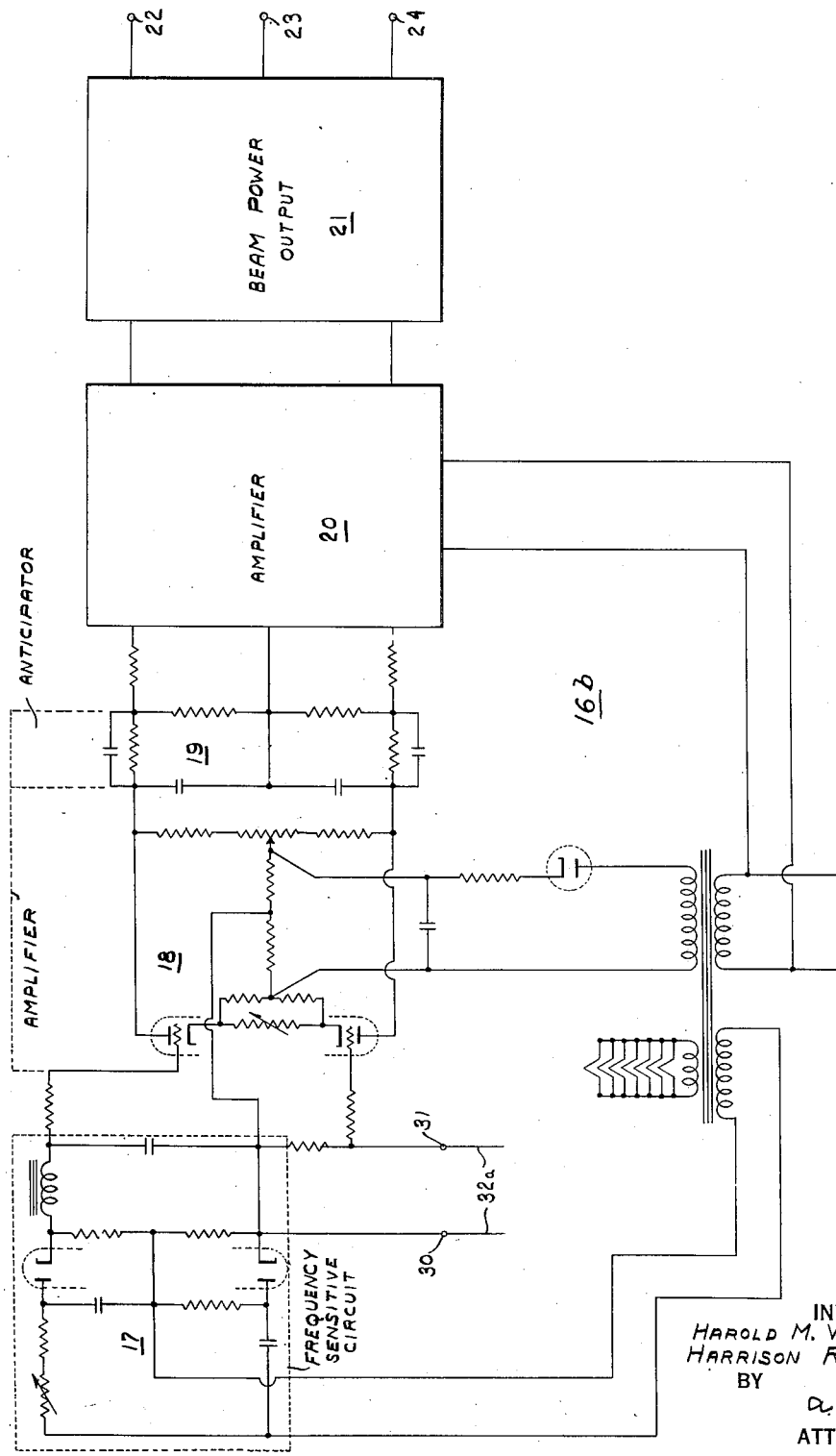

Since power is a function of the product of the voltage and the in-phase current, a measure of in-phase current will be directly proportional to power provided that the line voltage is held constant. In most applications, the line voltages of generators are held approximately constant. Therefore, in Fig. 6, the voltage $e$, which is a function of the total difference of in-phase current of the two alternators 12a and 12b, will be proportional to the difference in power outputs thereof. The voltage $e$ is a summation of the error voltage which appears at terminals 46a and 47a and at 46b and 47b and is applied by the leads 32a to the input terminals 30 and 31 of the slave regulator, at 16b (Fig. 4).

While the arrangement shown on Fig. 6 is the simplest and most practical in systems where the line voltage is held constant, in applications where the voltage varies, suitable provision must be made therefor. The arrangement shown in Fig. 7 satisfies the condition of voltage variation. Again, the same current transformer connections are maintained; however, the voltage and current quantities are fed into two standard type of electronic wattmeter circuits, at 50a and at 50b. The electronic wattmeter makes use of the very close similarity of triode tube characteristics and squared function curves to produce an output voltage which is proportional to $VI \cos \theta$, where "V" is proportional to the line voltage as introduced by the transformer at 43a, "I" is proportional to line current difference and is represented by the voltage drops across resistances 41a and 42a, and "$\theta$" is the phase angle between the voltage and current functions. The function of the electronic wattmeter is the same as that of an ordinary wattmeter except that a voltage quantity is obtained instead of a dial reading. The summation of voltages produced by the electronic wattmeter, at 50a and at 50b results in the error voltage $e$ proportional to the load differences of the two generators, such error voltage, as already described being supplied by the leads to the input terminals 30 and 31 of the slave regulator.

The load proportioning circuits described, and especially the arrangement of Fig. 6, have the advantage of simplicity in obtaining an error voltage proportional to load difference. Without the use of a proportioning circuit, such as indicated in Figs. 6 and 7, a regulation of ½% from no load to full load on large turbo-generators would be impractical. The circuit aids in system stability when two or more machines are connected in parallel. By properly proportioning the ratios of the current transformers, the load between two machines may be properly distributed according to their respective ratings.

While the load proportioning arrangement and the master and slave regulators have been described in connection with the application thereof to steam turbine regulation, it will be apparent to those skilled in the art that the apparatus may be employed wherever a voltage indication proportional to load unbalance is desired.

While the invention has been shown in but one form, it will be obvious to those skilled in the art that it is not so limited, but is susceptible of various changes and modifications without departing from the spirit thereof.

What is claimed is:

1. In power apparatus wherein first and second generators are connected to supply a common load and are respectively driven by first and second motors, a system for controlling the input of energy to the motors to minimize speed change thereof from no load to full load and to maintain division of load between the generators in a predetermined proportional relation; said system comprising means responsive to power outputs of the generators to provide an error quantity which is a function of the difference of such outputs, a master regulator responsive to frequency of the first generator to control the input of energy to the first motor, and a slave regulator responsive to frequency of the second generator and to said error quantity for controlling the input of energy to the second motor.

2. In power apparatus wherein first and second generators are connected to supply a common load and are respectively driven by first and second motors, a system for controlling the input of energy to the motors to minimize speed change thereof from no load to full load and to maintain division of the load between the generators in a predetermined proportional relation: said system comprising means responsive to power outputs of the generators to provide an error voltage which is the function of the difference of such outputs; a master regulator including means providing an output responsive to frequency of the first generator, means for modifying said output in response to the rate of change thereof, and means for controlling the input of energy to the first motor in response to said modified output; and a slave regulator including means providing an output responsive to frequency of the second generator, means responsive to said output and to said error voltage and to the rates of change thereof to provide a modified output, and means responsive to the modified output to control the input of energy to the second motor.

3. In a power plant having first and second generators connected to a common load and respectively driven by first and second turbines provided with admission valves operable to control the flow of motive fluid thereto, a system for controlling the flow of motive fluid to the turbines to minimize changes in speed thereof from no load to full load and to maintain the load divided between the generators in a predetermined proportional relation; said system comprising means responsive to generator power outputs to provide an error voltage proportionate to the difference of such outputs, a master regulator including means controlling the admission valve of the first turbine in response to frequency of the first generator, and a slave regulator including means responsive to frequency of the second generator and to said error voltage for controlling the admission valve of the second turbine.

4. In a power plant having first and second generators supplying a common load and respectively driven by first and second turbines provided with admission valves operable to control flow of motive fluid thereto, a system for controlling the flow of motive fluid to the turbines to minimize changes in speed thereof from no load to full load and to maintain the load divided between the generators in a predetermined proportional relation; said system comprising means providing an error voltage which is proportional to the difference of power outputs of the generators, a master regulator including a network responsive to frequency of the first generator to provide an electrical output and means responsive to said output for controlling the first admission valve, and a slave regulator including a network responsive to frequency of the second generator to provide an electrical output and means responsive to the last-named output and to said error voltage for controlling the second admission valve.

5. In a power plant having first and second generators supplying a common load and respectively driven by first and second turbines provided with admission valves operable to control flow of motive fluid thereto, a system for controlling the flow of motive fluid to the turbines to minimize changes in speed thereof from no load to full load and to maintain the load divided between the generators in a predetermined proportional relation: said system comprising means providing an error voltage which is proportional to the difference of power outputs of the generators; a master regulator including a network providing an electrical output responsive to frequency of the first generator, means for modifying said output in response to the rate of change thereof, and means responsive to said modified output for controlling the admission valve of the first turbine; and a slave regulator including a network providing an electrical output responsive to frequency of the second generator, means responsive to said output and to said error voltage to provide a resultant output, means responsive to the resultant output and to the rate of change thereof to provide a modified resultant output, and means responsive to the modified resultant output for controlling the admission valve of the second turbine.

HAROLD M. WATSON.
HARRISON R. LAMBERT.

REFERENCES CITED

The following references are of record in the file of this patent:

UNITED STATES PATENTS

| Number | Name | Date |
| --- | --- | --- |
| 1,095,178 | Warren | Apr. 28, 1914 |
| 1,762,672 | Spennemann | June 10, 1930 |
| 1,863,302 | Geiselman | June 14, 1932 |
| 2,050,338 | Kerr | Aug. 11, 1936 |
| 2,054,121 | Doyle | Sept. 15, 1936 |
| 2,054,411 | Doyle | Sept. 15, 1936 |
| 2,458,325 | Warren | Jan. 4, 1949 |